United States Patent [19]
Reich

[11] Patent Number: 5,892,446
[45] Date of Patent: Apr. 6, 1999

[54] WILD ANIMAL DETERRENT DEVICE

[76] Inventor: Lee A. Reich, 387 Springtown Rd., New Paltz, N.Y. 12561

[21] Appl. No.: 814,616

[22] Filed: Mar. 10, 1997

[51] Int. Cl.[6] .................................................... G08B 23/00
[52] U.S. Cl. .................................... 340/573.1; 340/573.2; 340/541; 119/720
[58] Field of Search .................................... 340/572, 573, 340/541, 523, 522, 693, 567, 573.1, 573.2; 119/713, 719, 720

[56] References Cited

U.S. PATENT DOCUMENTS

| | | | |
|---|---|---|---|
| 4,642,612 | 2/1987 | Crump | 340/541 |
| 5,009,192 | 4/1991 | Burman | 340/573 |
| 5,214,411 | 5/1993 | Herbuck | 340/573 |
| 5,257,012 | 10/1993 | Metcalf | 340/573 |
| 5,299,971 | 4/1994 | Hart | 340/567 |
| 5,381,323 | 1/1995 | Osteen et al. | 340/567 |
| 5,450,063 | 9/1995 | Peterson et al. | 340/573 |
| 5,458,093 | 10/1995 | MacMillan | 119/720 |
| 5,463,595 | 10/1995 | Rodhall et al. | 340/573 |
| 5,602,523 | 2/1997 | Turchioe et al. | 340/573 |
| 5,603,287 | 2/1997 | Houck | 119/720 |

*Primary Examiner*—Jeffery A. Hofsass
*Assistant Examiner*—Van T. Trieu
*Attorney, Agent, or Firm*—Burgess, Ryan & Wayne

[57] ABSTRACT

An animal deterrent device includes an infra-red heat and motion sensor which senses an animal in a predesignated area, the motion sensor having sensitivity adjustments for motion detection and darkness level at which the sensor is activated; a light source aimed at the predesignated area and which is activated by the sensor upon sensing an animal in the predesignated area; a pretuned radio which is turned on to emit sound to the predesignated area and which is activated by the sensor upon sensing an animal in the predesignated area; a first housing for holding the sensor; a second housing for holding the light source and the radio; a first adjustment device for adjusting a position of the first housing to adjust to a position at which the sensor is aimed; and a second adjustment device for adjusting a position of the second housing to adjust to a position at which the light source and radio are aimed, the first and second adjustment devices each includes a ball joint which connects the first and second housings to a main housing.

9 Claims, 2 Drawing Sheets

WILD ANIMAL DETERRENT DEVICE

BACKGROUND OF THE INVENTION

The present invention relates to a method of deterring animals from a specified area, and more particularly, is directed to a device that deters animals from an area under protection, by using light and sounds.

Wildlife can cause considerable damage as they enter and feed in fields, yards and gardens. Much of this feeding is done in the hours between dusk and dawn. Fences have been used to keep such animals at bay. However, fences used to exclude deer and other large animals must be extremely high and sturdy, or electrified. Thus, the cost and aesthetics obviate the use of fencing in many settings.

Various electronic devices that are activated by infra-red heat and motion sensors have been developed, but each of these deterrent devices has its limitations.

U.S. Pat. Nos. 5,009,192 and 5,458,093 utilize a spray of water to scare off animals, but such devices necessitate bringing water lines to the area needing protection. Further, water lines are subject to freeze damage in winter, which is a time when much animal damage occurs, and repeatedly spraying foliage with water invites disease problems in plants. A further limitation of such devices is that they will also wet people who might periodically enter the designated area for recreation or work.

Other devices have heat and motion sensors that activate audiotapes of dogs barking. Wild animals such as deer typically habituate to such sounds. Some of these prior devices require a conventional plug-in power source, so are further hampered in their convenience to the user by the need to bring electricity to the device.

Thus, there is no need for a device that is convenient to install and is effective at deterring animals from designated areas. Furthermore, there is a requirement that the device cause no harm to the animals or the environment, and no harm or inconvenience to humans who might enter the protected area. In all these regards, the present invention substantially fulfills these needs.

SUMMARY OF THE INVENTION

The present invention significantly improves upon prior art. Upon detecting the presence of an animal, a heat and motion sensor activates a light and radio. The combination of visual and auditory stimulants works together to frighten the animal. Sound from a radio is always changing, so it is effective at low volume and there is little chance of its becoming ineffective as animals become habituated to it.

Further, the choice of different power sources, including but not limited to conventional household electrical sockets, batteries and solar energy, makes the present invention very convenient to the user. The effectiveness of the present invention has been verified during extended use of a number of prototypes under field conditions.

Thus, in view of the disadvantages inherent in the known types of protective devices now present in the prior art, the present invention provides an improved concept and device to safely protect a designated area from animal intrusion. As such, the general purpose of the present invention, which will be described subsequently in greater detail, is to provide a new and improved method of deterring animals which has all the advantages of the prior devices and none of the disadvantages.

To attain this, the present invention essentially relates to a device comprised of a transistor radio and a high intensity halogen light that are activated by infra-red heat and a motion sensor which detects intrusion of an animal into an area. The animal is frightened away without injury by the surprise of the light and the sound from the radio, both of which automatically turn off following a brief interval after the animal leaves the area. A light sensor makes the device functional only in darkness, and the amount of darkness at which activation occurs is adjustable. The heat and motion sensor also is adjustable in its sensitivity.

As discussed above, the power source for the motion detector, light, and radio varies with the needs of the user. Conventional household current can be used, or the device can be powered by a 6 volt battery. The battery can be changed as needed, or be charged by a solar panel connected to the device by a few feet of wire. The latter makes this device especially convenient to install and maintain, especially at remote sites.

There has thus been outlined, rather broadly, the more important features of the invention in order that a more detailed description thereof that follows may be better understood, and in order that the present contribution to the art may be better appreciated. There are, of course, additional features of the invention that will be described hereinafter and which form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the concept, upon which this disclosure is based, may readily be utilized as a basis for the designing of other structures, methods and systems for carrying out several purposes of the present invention.

In view of the above, it is therefore an object of the present invention to provide a new and improved device for deterring animals from designated areas such as yards, fields and gardens, and which has all the advantages of prior art devices and none of the disadvantages.

It is another object of the present invention to provide a new and improved animal deterring device which may be easily and efficiently manufactured and marketed.

It is still another object of the present invention to provide a new and improved animal deterring device which is of a durable and reliable construction.

It is a further object of the present invention to provide a new and improved animal deterring device which is susceptible of a low cost manufacture with regard to both materials and labor, and which, accordingly, is then susceptible of low prices of sale to the consuming public, thereby making such devices economically available to the buying public.

It is a still further object of the present invention to provide a new and improved animal deterrent which will scare off intruding animals.

It is a yet further object of the present invention to provide a new and improved animal deterrent device which will not cause injury to animals, yet will deter them from remaining within the area protected by such device.

These objects, together with other objects of the invention, along with various features of novelty which characterize the invention, are pointed out with particularity in the claims annexed to and forming a part of this disclosure. For a better understanding of the invention, its operating advantages and the specific objects attained by its uses, reference should be made to the accompanying drawings and description in which there are illustrated preferred embodiments of the invention.

BRIEF DESCRIPTION OF THE DRAWINGS

The invention will be better understood and objects other than those set forth above will become apparent when consideration is given to the following description thereof. Such description makes reference to the annexed drawings wherein.

DESCRIPTION OF THE PREFERRED EMBODIMENT

With reference now to the drawings, a new and improved device for deterring animals from intruding into a designated area, which embodies the principles and concepts of the present invention, will be described.

Figure 1:
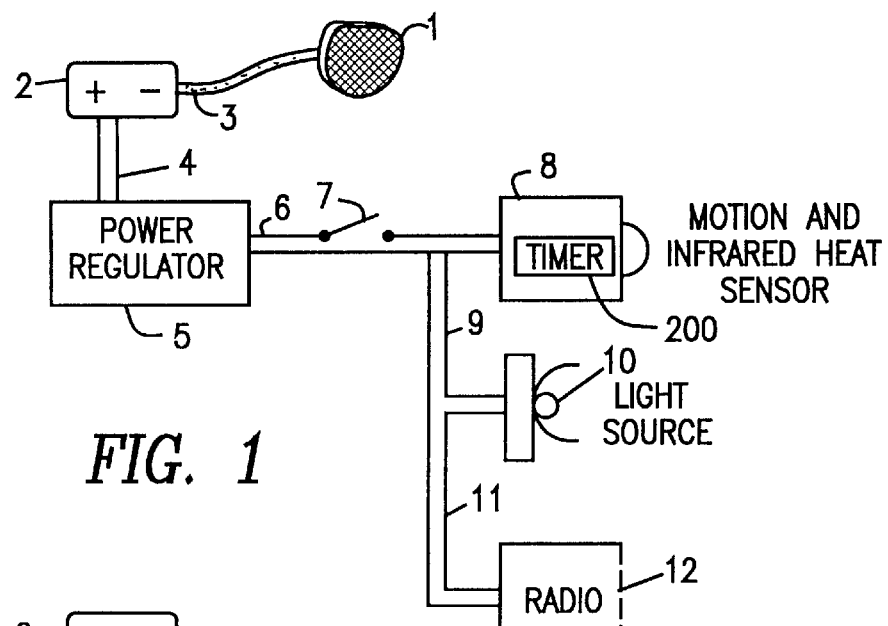
FIG. 1 is a schematic view showing the elements according to one embodiment of the present invention, wherein the device is powered by a solar charger.

Referring first to FIG. 1, one device for such purpose is shown in which sunlight is the ultimate source of power for this unit, and is captured by a solar panel 1. Electricity is fed from solar panel 1 via wire 3 to a battery 2, where power can be stored for use between dawn and dusk and during cloudy days. Electricity is fed from battery 2 to power regulator 5 via wire 4, and then on to a motion sensor 8 via wire 6. A switch 7 is connected to wire 6 to make it possible to deactivate the device, should the need arise. Preferably, switch 7 is a three position switch enabling the user to turn the device off in a first position, making the device operational in an automatic mode in a second position, or turning the device on while overriding the darkness sensor in a third position. The last setting allows the user to set up the device adjusting such things as the direction and sensitivity of the sensor and tuning the radio during daylight hours.

Motion sensor 8 has three adjustable settings, namely a first setting which regulates how soon the timer 200 automatically turns off once the sensor is no longer detecting motion; a second setting which adjusts the sensor's sensitivity to infra-red heat and motion; and a third setting which adjusts the sensor's sensitivity to light, which deactivates the sensor so that it responds only between dawn and dusk. Wire 9 carries electricity to light source 10, which is pointed in the same direction in which electricity to a conventional radio 12 such as a transistor radio whose speaker likewise is pointed in the same direction in which motion sensor 8 is detecting motion. Radio 12 has a switch (not shown) for turning it on and off, as well as a means (not shown) of tuning it to any one of various radio stations, as is conventional.

Figure 2:
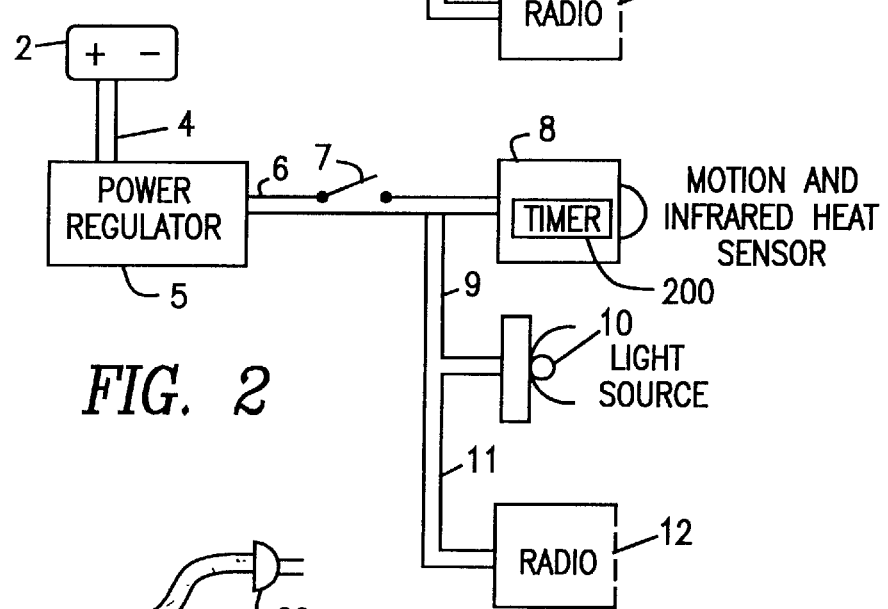
FIG. 2 is a schematic view showing the elements according to another embodiment of the present invention, wherein the device is powered by a replaceable battery.

The device shown in FIG. 2 is essentially the same as that shown in FIG. 1, except that the source of power for the device is a battery 2. Electricity is fed to power regulator 5 via wire 4. The unit typically draws power for very brief intervals of time so that batteries need only infrequent replacement.

Figure 3:
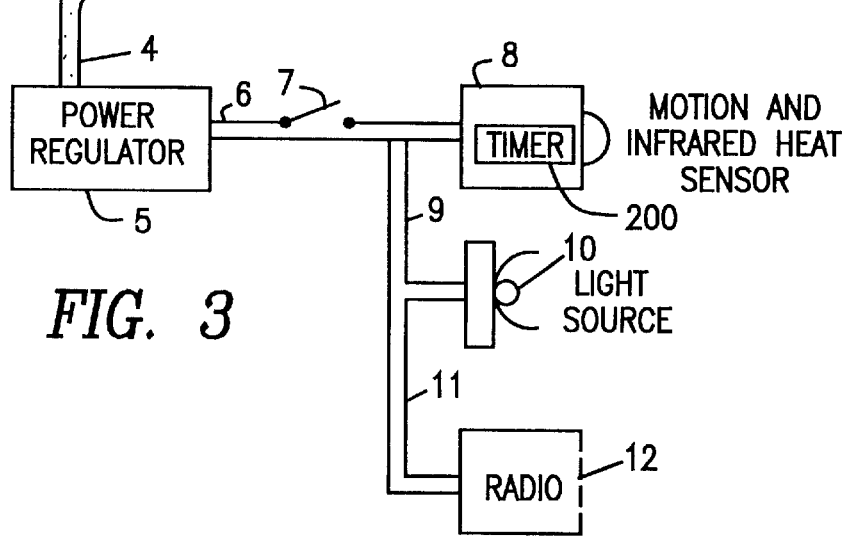
FIG. 3 is a schematic view showing the elements according to still another embodiment of the present invention, wherein the device is powered by conventional household current.

The device shown in FIG. 3 is essentially the same as that shown in FIG. 1 except that the source of power for the device is a conventional household current. A plug 20 for the conventional household current is carried to power regulator 5 via wire 4. Such an arrangement is convenient for units permanently mounted on or near homes, buildings, or other places proximal to conventional power sources.

Figure 4:
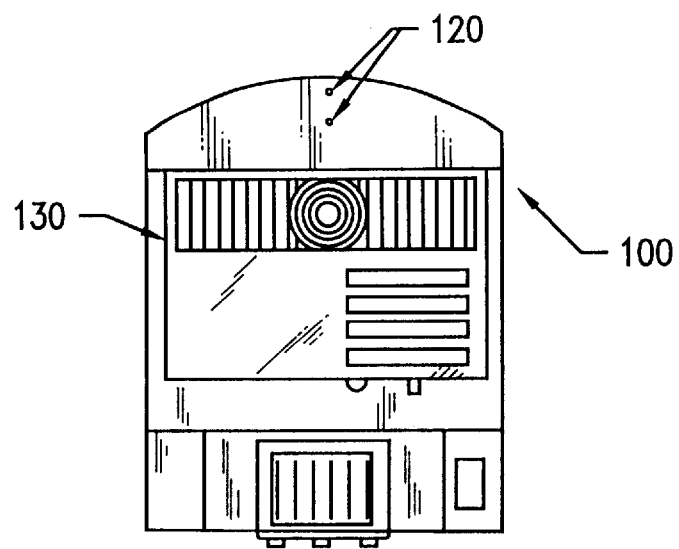
FIG. 4 is a front elevational view showing one embodiment in which the parts that make up this device are assembled.
Figure 5:
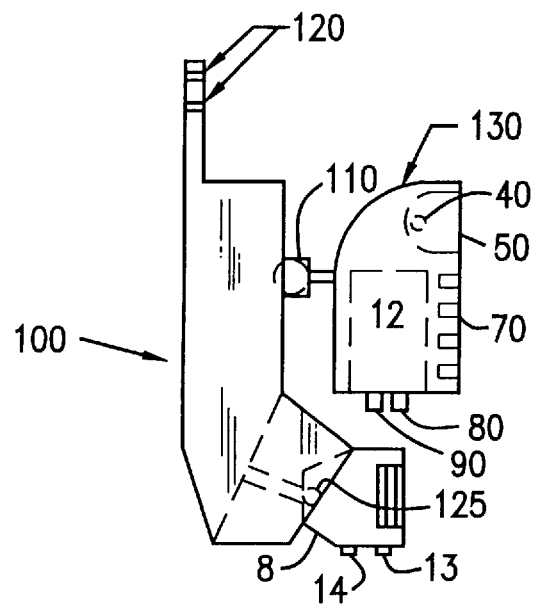
FIG. 5 is a side elevational view of the arrangement shown in FIG. 4.

FIGS. 4 and 5 show an embodiment of one way in which the parts of the device that embody the principles and concepts of the preset invention might be arranged. Parts of the depicted unit are preferably constructed of plastic with all fittings, seams, joints, switches and dials being made weatherproof by virtue of their position or manufacture. Housing 100 has screw holes 120 by which the device may be mounted, and contains the aforementioned power regulator, batteries, a main on/off switch and other electronics (not shown) that might be needed. A light and radio unit 130 is wired and physically attached to housing 100 through a ball joint 110 so that the direction of light and sound can be varied. Light from a high intensity halogen bulb 40 as a light source 10 passes through plastic lens 50. Sound from radio 12 passes out through downward sloping openings 70, and is regulated by a tuning switch 80 and on/off switches 90. Motion sensor 8 is likewise wired and physically attached to the housing via a ball joint 125 so that the sensor can be aimed at the detection area. Switches and dials that regulate the function of motion sensor 8 are at its bottom, such as control button 13 which controls the sensitivity adjustment for motion detection and control button 14 which controls the adjustment as to what level of darkness the motion sensor becomes functional.

Thus, with the present invention, the infra-red and motion sensor 8 is pointed to an area in which an animal is to be detected. Light and radio unit 130 is also pointed to the same area. Upon detection of an animal in the area, by at least one of motion and infra-red heat, current is supplied to light source 10 and radio 12, whereby both light and radio sounds such as music obtained through the airwaves, are transmitted to, the area, to scare away the animal. Preferably, light source 10 and radio 12 would stay on for about 30 seconds after stimulus ceases. Since deer are sensitive to noise, the radio volume need not be set loud.

Once deer are scared away by the device, they would learn to stay away, so that light source 10 and radio 12 would be less frequently activated.

Further, a light sensor could be used to adjust the level of darkness at which the device would operate.

The device according to the present invention can be used, for example, to keep deer out of a garden, or any other area of about 1500 square feet. The device could be mounted onto a pole, tree or wall at the edge of the area to be protected.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described and accordingly, and all suitable modifications and equivalents may be resorted to, falling within the scope of the invention.

What is claimed:

1. An animal deterrent device comprising:

a sensor which senses an animal in a pre-designated area;
a light source aimed at the pre-designated area and which is activated by the sensor upon sensing an animal in the pre-designated area;
a pre-tuned radio which is turned on to emit a sound to the pre-designated area and which is activated by the sensor upon sensing an animal in said pre-designated area;
a common housing;
a first housing mounted to said common housing for holding said sensor;
a second housing mounted to said common housing for holding said light source and said radio;
a first adjustment device for adjusting a position of said first housing about a horizontal axis and a vertical axis relative to said common housing to adjust a position at which said sensor is aimed; and a second adjustment device for adjusting a position of said second housing about a horizontal axis and a vertical axis relative to said common housing to adjust a position at which said light source and radio are aimed, independent of the adjustment of said first adjustment device.

2. An animal deterrent device according to claim 1, wherein said sensor includes an infra-red heat and a motion sensor.

3. An animal deterrent device according to claim 2, wherein said motion sensor includes a timer to turn off the light source and radio following a brief period of operation after which the sensor is not longer activated.

4. An animal deterrent device according to claim 2, wherein said motion sensor has sensitivity adjustments for motion detection.

5. An animal deterrent device according to claim 2, wherein said heat and motion sensor can be adjusted as to what level of darkness the motion sensor becomes functional.

6. An animal deterrent device according to claim 2, wherein said sensor has three adjustable settings of:

a first setting which regulates how soon the timer automatically turns off once the sensor is no longer detecting motion;
a second setting which adjusts the sensitivity of the sensor to infra-red heat and motion; and
a third setting which adjusts the sensitivity of the sensor to light for activation and deactivation thereof.

7. An animal deterrent device according to claim 1, further comprising a power source for said device, said power source being selected from the group consisting of:

(a) a conventional household current,
(b) a battery, and
(c) electricity captured by a solar panel and stored in a battery.

8. An animal deterrent device according to claim 1, wherein said light source is a high intensity halogen bulb.

9. An animal deterrent device according to claim 1, wherein said first and second adjustment devices each includes a ball joint which connects the first and second housings to a main housing.

* * * * *